March 17, 1964 W. R. BAKER 3,125,492
PLASMA HEATING AND CONFINING SYSTEM
Filed April 19, 1960 4 Sheets-Sheet 2

INVENTOR
WILLIAM R. BAKER
BY
ATTORNEY

INVENTOR
WILLIAM R. BAKER

BY

ATTORNEY

March 17, 1964 — W. R. BAKER — 3,125,492
PLASMA HEATING AND CONFINING SYSTEM
Filed April 19, 1960 — 4 Sheets-Sheet 4

INVENTOR
WILLIAM R. BAKER
BY
ATTORNEY

United States Patent Office 3,125,492
Patented Mar. 17, 1964

3,125,492
PLASMA HEATING AND CONFINING SYSTEM
William R. Baker, Orinda, Calif., assignor to the United States of America as represented by the United States Atomic Energy Commission
Filed Apr. 19, 1960, Ser. No. 23,343
10 Claims. (Cl. 176—2)

The present invention relates generally to the confinement and heating of an electrical plasma and, more particularly to an apparatus for producing nuclear interactions in a plasma.

Considerable effort is being directed toward developing apparatus for the production, heating, and confinement of an electrical plasma. Such a plasma, comprised of free electrons and positive ions, may be formed by ionizing a gas such as deuterium, tritium, helium or lithium. If the plasma is confined and the temperature increased sufficiently, nuclear reactions can be produced. The ultimate goal of this development effort is the production of thermonuclear energy at controlled rates by fusion of gas particles to form heavier particles, in which process considerable recoverable energy is released.

In a plasma containment device, it is necessary to prevent the plasma from contacting the walls of the surrounding vessel since the plasma would be cooled by such contact and plasma contaminating particles would be released from the wall. Plasma temperatures exceeding 100,000,000° C. may be required, necessitating the usage of some non-contaminating and non-cooling agency such as a magnetic field for the containment means. A number of suitable magnetic field configuration have been developed within the art for the purpose of confining plasmas in this manner, the mirror field, and the cusp field, being examples.

In conjunction with the containment field, a means of establishing a plasma therein must be provided. One such means is to form the field around a quantity of gas. It has been found, however, that the amount of plasma which can be generated and entrapped in this manner is limited. Accordingly, considerable development effort has been made on mechanisms for generating the plasma externally and injecting it into the field. The injection technique offers the further advantage that the plasma may be given considerable initial energy and that opposed beams of plasma may be directed into the field thereby enhancing the heating of the plasma within the containment region.

The field acts to exclude external particles as well as to contain internal ones. Accordingly, the injection of plasma can only be satisfactorily carried out along certain zones of the field at which the flux lines thereof are directed outward. Partially as a consequence of this consideration, the injection of plasma beams into the field has heretofore been done only along a single linear axis and the amount of plasma which was injected as well as the heating effect achieved was therefore limited.

The present invention provides a novel plasma injection apparatus in which much more plasma can be injected and concentrated, such apparatus being in combination with a field configuration capable of receiving and containing the plasma. Specifically, the invention utilizes a field configuration having an entrance zone which extends along a planar region, rather than being confined to a single linear axis, and uses an injection apparatus in which a column of plasma is propelled at right angles to its length into the containment field. Thus a long plasma column may be laterally accelerated into the containment region from each of two opposite sides thereof producing a high concentration of plasma therein and a high degree of heating. As a further and more complete application of the concept, the plasma gun may be an annular arrangement completely encircling the containment field which in this case necessarily has a cuspate configuration. An annular plasma from the plasma gun may be accelerated radially inward to concentrate at the center of the field. In either configuration, the effect of the convergence of opposed plasmas is a pronounced randomization of the particle motion therein which is effectively an extreme heating thereof to a degree sufficient to induce nuclear interactions.

Thus much of the kinetic energy imparted to the plasma body by the gun is transferred to the plasma within the containment region in the form of heat. Further energy can be added to the contained plasma by compression thereof, i.e., by increasing the containment field. At certain levels of heating, various forms of nuclear interaction are produced and the neutrons emitted thereby may be utilized for irradiation, heating, and other purposes. In an apparatus in which the containment and heating reaches a level that sufficient fusion reactions occur, useful power may be obtained. Power, in the case of a fusion reaction, may be obtained from such apparatus by various mechanisms known to those skilled in the art. The emitted radiations, for example, may be utilized as a heat source for a conventional electrical generation facility. Alternately, the electrical pressure of the plasma against the containing field may be used as a source of power.

Therefore it is an object of the present invention to provide an improved system for heating and containing a plasma.

It is another object of this invention to provide apparatus for generating nuclear interactions by the containment and heating of a plasma.

It is a further object of the invention to provide a system for injecting a broad plasma body into a magnetic confinement means.

It is yet a further object to provide a system for increasing the thermal energy of a plasma body by converting the directed kinetic energy of the plasma body into thermal energy.

It is still another object of the invention to provide apparatus for the generation and acceleration of broad electrical plasma bodies.

It is an object of the invention to provide a broad plasma body generator in combination with means for concentrating and confining component particles of said plasma and for randomizing the motion thereof whereby interactions between said particles are induced.

The invention, both as to its organization and method of operation, together with further objects and advantages thereof will best be understood by reference to the following specification taken in conjunction with the accompanying drawing in which.

Figure 1:
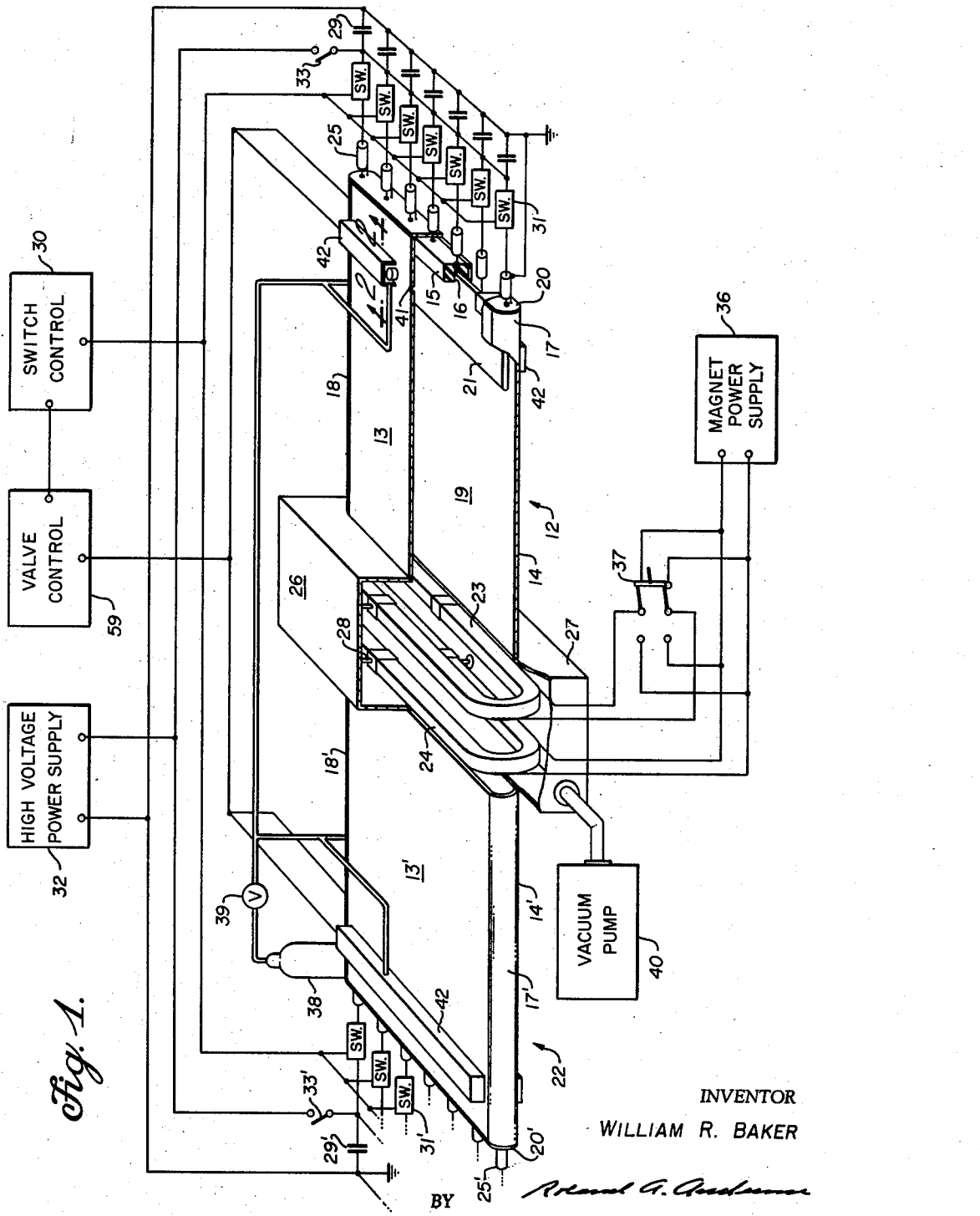
FIGURE 1 is a perspective view of a first embodiment of the invention in which parallel linear plasma bodies are laterally accelerated into a containment field from opposite sides thereof, portions of the system being shown schematically.

Referring now to the drawing and more particularly to FIG. 1 thereof, there is shown a plasma heating apparatus of a type having two long plasma guns disposed along opposite faces of a long central containment field generating means. A first of the plasma guns 12 is comprised of a rectangular upper plate 13 in parallel relationship with a matching lower plate 14. An insulator 15 is disposed between the upper plate 13 and lower plate 14 in alignment with the outer edges thereof and in vacuum tight contact therewith. An inwardly facing central longitudinal slot 16 in the insulator 15 has a depth approximately one-half the thickness of the insulator. Similarly, a pair of arcuate conductive end members 17 and 18 are disposed between opposite ends of the upper plate 13 and lower plate 14 and in vacuum tight relationship therewith. A flat rectangular chamber 19 is thus formed between the upper plate 13 and lower plate 14 with two sides closed by the arcuate members 17 and 18 and a third side closed by the insulator 15. A rectangular central electrode 21 fits into the slot 16 in the insulator 15 and projects for a limited distance into the chamber 19 midway between the upper plate 13 and lower plate 14. The upper and lower plates 13 and 14 are electrically coupled together by an apertured end member 20 disposed along the outer surface of the insulator 15 and contacting the edges of plates 13 and 14. A plurality of coaxial cables 25 have outer shields connected to the member 20 while the insulated inner coaxial conductors of the cables extend through the apertures in the member 20, and through matching apertures in the insulator 15 to electrically connect to the central electrode 21. The cables 25 are connected at intervals along the central electrode 21 to provide proper pulsed current distribution thereon.

The structure of the second plasma gun 22 is identical to that of the first plasma gun 12, the elements of the second gun being designated by corresponding prime numbers. The two plasma guns are disposed in a coplanar and parallel relationship with the open ends of the guns spaced apart and facing. In a relatively small prototype plasma heating apparatus useful for conducting various nuclear interactions, the gun chambers may be, for example, 7" wide, 2" high, and 15" long.

Means for generating a plasma-containing magnetic field are positioned between the two guns 12 and 22. Such field is produced by a pair of parallel spaced apart field coils 23 and 24 which encircle the control plane of the plasma guns 12 and 22 so that the ejected plasma passes through the central openings of the coils to a trapping region therebetween. Upper and lower rectangular coil covers 26 and 27 extend around the field coils 23 and 24 to the adjacent edges of the plasma guns 12 and 22 to form a closed vacuum chamber therearound. Insulative support rods 28, connecting with the coil covers 26 and 27, hold the field coils 23 and 24 in position within the vacuum chamber.

Considering now the electrical connections to the plasma guns 12 and 22, a high current from a plurality of charged capacitors 29 and 29' is applied through the cables 25 and 25' between the central electrodes 21 and 21' and the parallel connected upper and lower plates 13 and 13' and 14 and 14' by closing series connected discharge switches 31 and 31'. A closing signal from a single switch control 30 insures that all the discharge switches 31 and 31' close simultaneously. With respect to the foregoing connections, the upper and lower plates 13 and 14 are preferably maintained at ground potential to simplify problems of insulation. As will be hereinafter discussed in more detail, the plasma guns must be provided with a very heavy current over a short time period for proper operation. The capacitors 29 and 29' are first charged by connection with a high voltage power supply 32 through series connected charge switches 33 and 33'. In the prototype apparatus of previous mention, the capacitors may be charged to, for example, 30 kv. The charge switches 33 and 33' are opened to remove the high voltage power supply 32 from the circuit before the discharge switches 31 and 31' are closed for firing the plasma guns. The power supply 32 can provide a limited current over an extended time period, but the plasma guns require a brief heavy current. However, the capacitors 29 and 29' can accumulate a heavy charge from the power supply 32 over a long time period and discharge a high current through the plasma guns in a very short time, thereby fulfilling the requirements.

Considering next the energizing system for the field coils 23 and 24, a power supply 36 is connected directly to the second field coil 24 and through a polarity reversing switch 37 to the first field coil 23. The field coils 23 and 24 as shown are connected so that the current therethrough is in the same direction, but by operation of the polarity switch 37, the direction of current flow through the first magnet coil 23 can be reversed. With the switch in the position shown, the current through both coils flows in the same direction creating a mirror type magnetic field. With the polarity switch 37 in the opposite position, a cusp type magnetic field is created around the field coils 23 and 24. As will hereinafter be discussed, either field is suitable for plasma containment and the described polarity switch is not essential but may be found convenient in that the characteristics of the two fields differ somewhat.

Considering now the gas system, a vacuum pump 40 is connected with a port in an end wall of the lower cover 27 to evacuate the plasma guns 12 and 22 and the coil regions. A gas supply tank 38 is connected through the master valve 39 to each of four linear valves 42 each of which valves covers a line of small inlet ports 41 on both sides of each plasma gun. The rows of inlet ports 41 extend across both the upper and lower plates 21 and 14 parallel to the slotted insulator 15 but removed therefrom by a small distance such that after injection of a quantity of gas through the ports, the diffusing gas body cannot reach the insulator before the accelerating electrical discharge is applied. By spacing the ports 41 in this manner it is possible to prevent a possible insulator breakdown caused by gas discharge currents adjacent the insulator. Ideally, a continuous slit would be provided instead of the ports 41, but a path for current flow must be maintained in the upper and lower plates 13 and 14 transverse to the line of ports 41. However, the closely spaced ports 41 are a satisfactory compromise.

Figure 2:
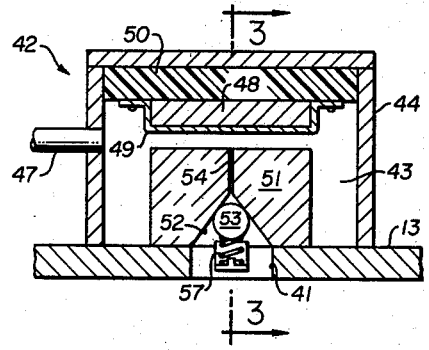
FIGURE 2 is a section view taken at line 2—2 of FIGURE 1 and showing a gas valve forming an element of the embodiment of FIGURE 1.
Figure 3:
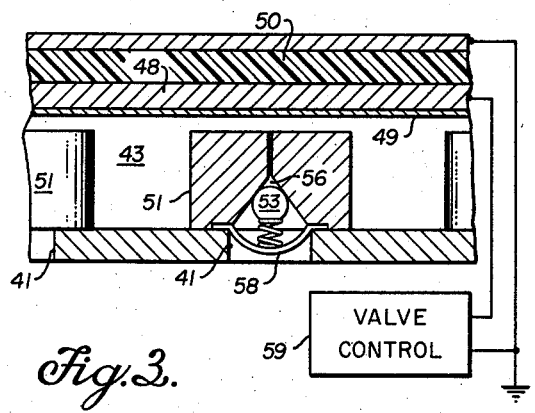
FIGURE 3 is a section view of the valve taken at line 3—3 in FIGURE 2.

It is desirable that gas be emitted through all the ports 41 into the plasma guns rapidly and simultaneously. Referring now to both FIG. 2 and FIG. 3, details of the valves 42 are shown, such valves being one example of a mechanism suitable for metering gas into the plasma guns. An identical valve mechanism 42 is mounted over each line of ports 41 on each plasma gun, the valve mechanisms being adapted to inject a small jet of gas through each port 41 upon receipt of an electrical pulse. Considering now the specific structure, a long rectangular narrow chamber 43 is formed over the ports 41 by a housing 44 joined to the upper plate 13 so that the chamber 43 is vacuum tight. A gas conduit 47 connects the housing 44 with the gas supply master valve 39, thus supplying the chamber 43 with gas from the supply tank 38 as shown in FIG. 1. To induce a magnetic shock for purposes of actuating the valve as will be described, a linear conductor 48 is secured to an insulator 50 attached to the upper inside wall of the housing 44 by a clamp 49. The positioning of the conductor 48 prevents undue magnetic coupling of field therearound with the housing 44. An annular valve socket 51 of conductive material is mounted on the upper plate 13 over each port 41, each socket having a conical valve seat 52 facing the subjacent port 41.

A ball valve 53 ordinarily presses against the conical valve seat 52 and prevents gas from passing therethrough to the port 41. A valve spring 57 supports and presses the ball valve 53 against the valve seat 52 and a spring support 58, extending across the port 41 but not blocking passage of gas therethrough, positions the valve spring 57 and holds it in compression against the ball valve 53. A gas leak channel 54 having restricted cross-sectional area provides communication through the valve socket 51 from the chamber 43 to a conical space 56 defined by the apex of conical valve seat 52 and the ball valve 43.

A pulsed power supply valve control 59, synchronized with the switch control 30, as shown in FIG. 1, is connected to the conductor 48 and supplies current thereto, the current returning through the walls of housing 44 or a return path conductor may be provided. In the operation of the valves 42, gas passes through the leak channel 54 into the conical space 56 but further progress is prevented by the ball valve 53. When the gas is to be released through the port 41, a heavy pulse of current from the valve control 59 is passed through the conductor 48, suddenly creating a magnetic field therearound. The pulsed magnetic field creates a mechanical shockwave in the valve socket 51 which travels therethrough to the ball valve 53, momentarily knocking it away from the valve seat 52 and releasing the gas in the conical space 56 through the port 41. The restrictive size of the leak channel 54 prevents any appreciable gas from issuing therethrough during the short interval the ball valve 53 is open. Therefore, for a given pressure, the gas released through the port 41 is almost entirely a function of the size of the conical space 56 and the amount of gas injected into the plasma guns can be fixed by the dimensioning of space 56. In the prototype apparatus the amount of gas introduced to the guns is such as to establish at the inlet ends thereof a density of the order of $10^{15}$ to $10^{16}$ particles per cc., and pressure of the order of 10 to 100 microns.

Figure 4:
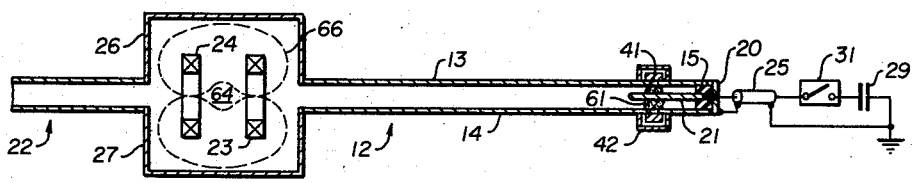
FIGURES 4 to 8 are simplified section views of the apparatus of FIGURE 1 showing progressive stages in the operation thereof.

Considering now the operation of the invention, assume that a suitable vacuum has been created in the plasma guns and containment region and that the magnet coils 23 and 24 are energized and the capacitors 29 and 29' are charged in the manner hereinbefore described. The operation will best be understood by reference to FIGS. 4 through 8, wherein only the salient components of the invention are shown so that the magnetic fields and plasma may be shown with more clarity. The upper and lower plates 13 and 14, member 20, electrode 21, cable 25 and slotted insulator 15 of the plasma guns are shown in section. A single capacitor 29 and switch 31 are shown, the functioning thereof typifying that of all the like components. In the containment portion of the invention there is shown the first and second field coils 23 and 24 with the coil covers 26 and 27. In FIG. 4 and the succeeding FIGS. 5, 6 and 7, the operation of the plasma guns and plasma containment and heating means is shown in progressive steps. A mirror magnetic field is established between the plasma guns 12 and 22 by energization of the field coils 23 and 24 as indicated by field lines 66. The field is of greater intensity within the coils 23 and 24 than midway between the coils and thus a plasma trapping region is established in accordance with processes well understood within the art.

Considering first generation and acceleration of the plasma, and with reference to FIG. 4 in particular, a quantity of ionizable gas 61 is shown just after having been emitted into the interior of the plasma gun through the ports 41 by operation of the valves 42 as hereinbefore described. The switch 31 is synchronized with the operation of the valve control 59 so that it will close immediately after the gas injection and before any of the gas 61 has time to drift to the slotted insulator 15. The foregoing action is identical and simultaneous in both plasma guns 12 and 22.

Figure 5:
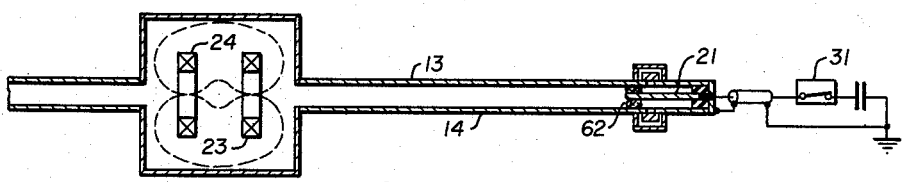

With reference to FIG. 5 which illustrates conditions just subsequent to those shown in FIG. 4, the switch 31 is now closed and heavy current flows from the center electrode 21, through the gas 61 to both the upper and lower plates 13 and 14 to form two current loops, the electrode 21 being common to both. The gas is immediately ionized by the current into a plasma 62. The magnetic forces in any closed current loop push outward on the conductors, but in the present instance the only portion of the loops that can yield to the pressure is the plasma. Accordingly, the plasma moves toward the field coils 23 and 24 with increasing velocity and without breaking contact with the center electrode 21 and the upper and lower plates 13 and 14. Current continues to flow through the two loops and a magnetic pressure is continuously exerted on the plasma 62.

Figure 6:
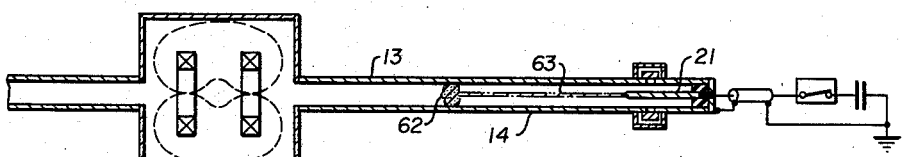

Referring next to FIG. 6, the plasma 62 is shown after having passed beyond the center electrode 21, but leaving a sheet of plasma 63 connecting back to the center electrode 21, the two current loops remain undisrupted and the velocity of the plasma 62 continues to increase. Both sides of the plasma sheet 63 will be subjected to exactly equal magnetic pressures, compressing the plasma into the thin ribbon shape of sheet 63. The magnetic field gradient on each side of the sheet 63 is uniform so that the plasma body forms and progresses in a uniform front normal to the metal walls 13 and 14 and central electrode 21. Thus the sheet 63 is neutrally stable with regard to instabilities similar to the "zero mode" or "sausage" type (Reference: page 95, "Project Sherwood," by Amasa S. Bishop, published by Addison-Wesley Publishing Co., Inc., 1958). The plasma sheet 63 maintains a position equidistant between upper plate 13 and lower plate 14. If the distance between the plasma sheet 63 and one of the plates decreases, the inductance of the circuit likewise drops and the current increases to restore a balance. A weak instability of the "sausage" type at the edges of the plasma sheet will not generally grow to troublesome magnitude in the short time involved.

Figure 7:
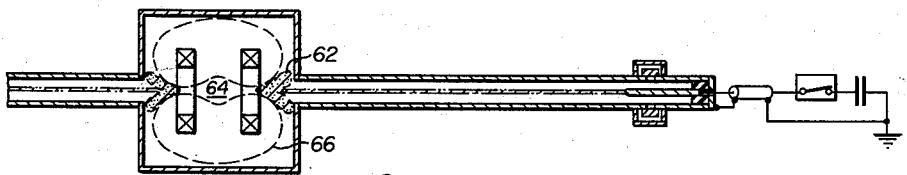

Referring now to FIG. 7, the magnetic field developed by diamagnetic currents flowing through the plasma when it arrives at the mirror push aside the mirror field 66 so that the plasma 62 can pass through the mirrors and into the entrapment region 64. The motion is facilitated in that the plasma 62 becomes concentrated or focused at the orifice of the plasma guns, such intensely concentrated and accelerated plasma readily passing through the magnetic mirror 66.

Figure 8:
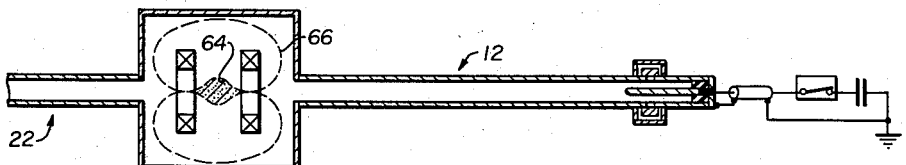

Referring now to FIG. 8, the concentrated plasma defocuses after passing through the mirror 66 and rebounds against the magnetic flux defining the entrapment region 64. The plasma from the opposite plasma gun 22 enters the central region 64 at the same time plasma enters from the first plasma gun 12 and the sheets of plasma from the two guns collide and further defocusing of the plasma occurs, transforming the motional energy in the plasma into random thermal heat energy, the effect being termed "entropy trapping."

If the kinetic energy of the plasma ions is sufficient to overcome the electrostatic repulsion between the nuclei, interactions therebetween are initiated. At a first level of heating, the production of considerable quantities of neutrons will occur, which may be utilized for irradiation. At a higher degree of plasma heating productive power is obtained. Either a neutron or a proton may be emitted during such fusion of particles. The total kinetic energy of the fused and emitted particles exceeds considerably the total kinetic energy of the original particles, and accordingly the process offers a means of producing useful power. To convert the particle kinetic energy to a more generally useful form, the emitted neutrons can be utilized for heating a suitable fluid and electricity generated therefrom in the conventional manner. Electrical energy can also be obtained directly from the expanding force of the plasma against the magnetic field, generating increased currents in the magnetic field coils 23 and 24 or other coils disposed to intercept the outwardly moving magnetic field.

Figure 9:
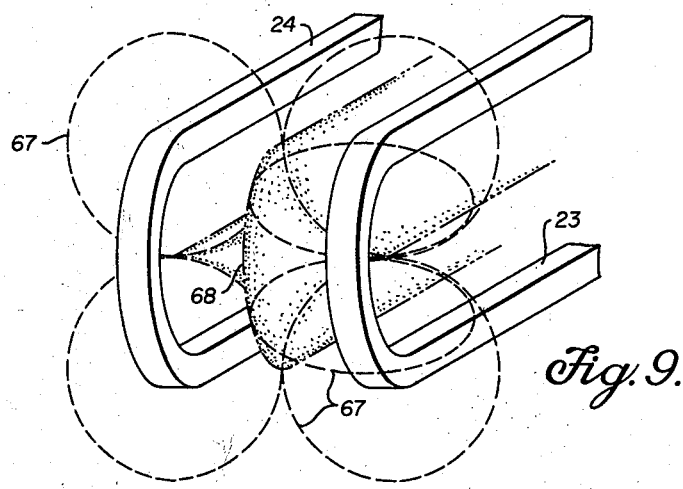
FIGURE 9 is a perspective view of the coils and containment region of the apparatus of FIGURE 1 with an alternate field configuration.

An alternate form of containment field may be established in the apparatus of FIG. 1 by actuation of the polarity switch 37 to reverse the direction of current flow through the first field coil 23. If current through the two field coils 23 and 24 is in the same direction, the modified magnetic mirror field configuration is established as discussed above and as shown in FIGS. 4 to 8. If the currents through the two coils are in opposite directions, as occurs in the alternate position of the polarity switch 37, a field is created which has a cusp configuration as shown in FIG. 9. In the latter field configuration, the magnetic flux around each leg of the field coils 23 and 24, as indicated by dashed lines 67, is directed opposite to the flux around each of the most proximal coil legs thereby forming a central containment region 68 which has a quadri-cuspate configuration when viewed in section.

The processes by which a magnetic mirror configuration or a cusp configuration act to contain plasma are discussed in the text: Project Sherwood, hereinbefore referred to. The containing action of the fields in the present invention is essentially similar to that discussed in the specified text although it will be noted that the fields in the above-described apparatus differ from those heretofore employed in that the present fields are elongated in a direction transverse to that at which plasma is injected in order to receive the broad linear plasma bodies.

Figure 10:
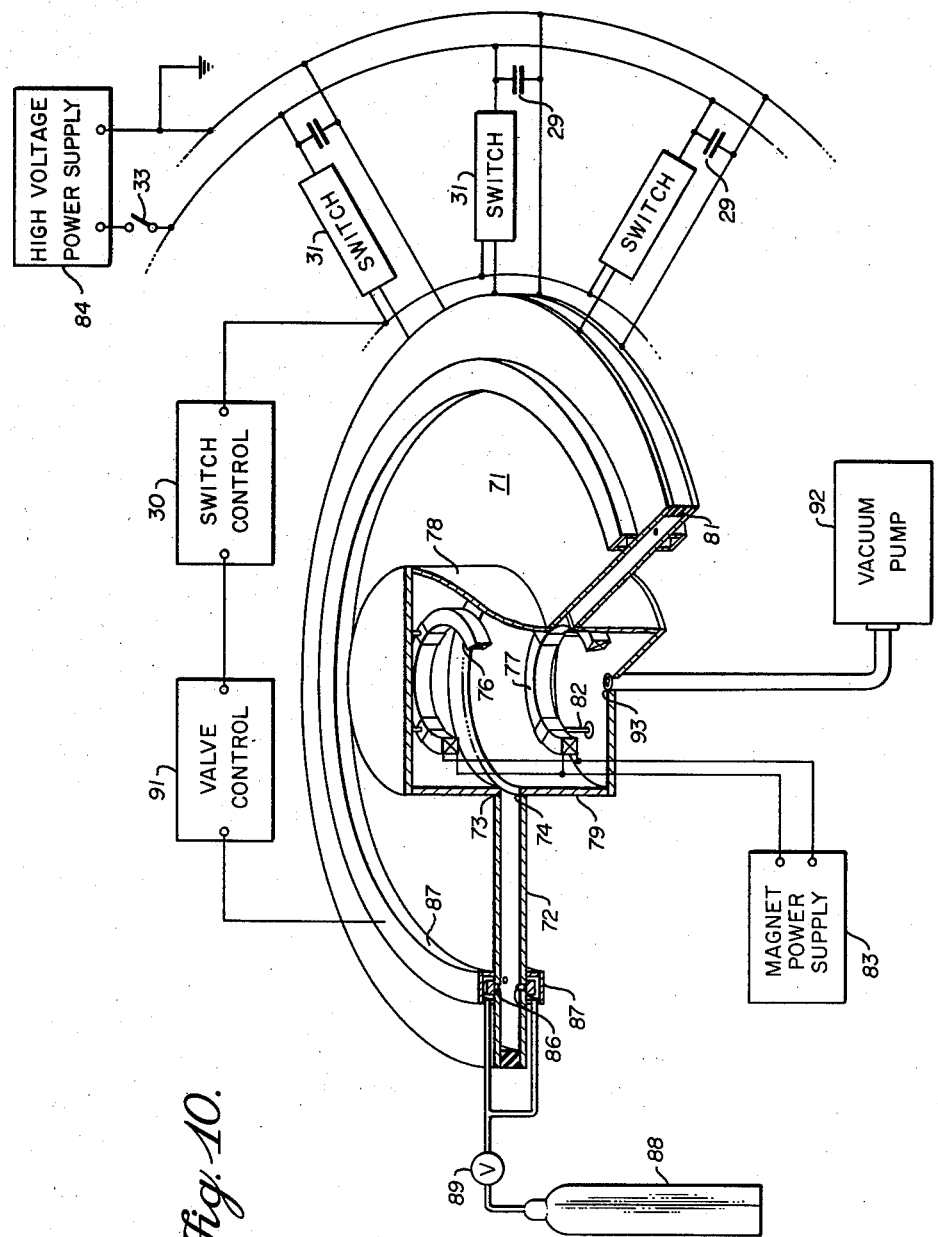
FIGURE 10 is a perspective view of a second embodiment of the invention in which an annular plasma is accelerated radially inward to a containment field.

Referring now to FIG. 10 there is shown a second embodiment of the invention wherein an annular plasma gun accelerates plasma radially inward to a central containment region which in this instance must be a cusp-shaped field. This embodiment has the advantages of complete symmetry and low inductance in the plasma acceleration system.

Considering now the structure of the annular plasma gun, an upper annular plate 71 is disposed in spaced apart coaxial relationship with a lower annular plate 72 of similar configuration. The region between upper and lower plates 71 and 72 is closed around the periphery and made vacuum tight by an annular insulator 81. Each of the plates 71 and 72 has a central circular opening 73 and 74, respectively, wherein the plasma containment field is formed. To provide the field, a first circular coil 76 and a second circular coil 77 are disposed coaxially with respect to plates 71 and 72, coil 76 being spaced slightly above opening 73 and coil 77 being slightly below opening 74. Cylindrical upper and lower coil covers 78 and 79 enclose the coils 76 and 77 respectively and form a vacuum tight juncture with plates 71 and 72.

In this embodiment of the invention the upper plate 71 must be electrically insulated from the lower plate 72. Accordingly, the coil supporting means, specifically rods 82 extending from the coil covers 78 and 79 to the coils 76 and 77, are formed of insulative material to isolate the coils. The coils 76 and 77 are energized from a power supply 83 and are connected in parallel with the current directed oppositely in the two coils to create the cusp type field.

Considering now the high current, high voltage power supply for the plasma gun, a plurality of capacitors 29, capable of storing a large quantity of energy, are disposed about the circumference of the plasma gun. A like plurality of switches 31, each connected in series with a capacitor 29, control the discharge of the capacitors into the plasma gun. The switches 31 are each closed simultaneously by a signal from a switch control circuit 30. As described in connection with the first embodiment of the invention, the capacitors 29 are charged from a high voltage supply 84 through a charge switch 33. Prior to the discharge of the capacitors 29 through switches 31, the switch 33 is opened to remove the high voltage power supply 84 from the circuit.

The gas supply system for the annular plasma gun is similar to the system described in connection with the embodiment of FIG. 1 except that elements associated with the gun are arranged in a circular rather than a linear configuration. The gas inlet ports 86 are situated in an annular band around both the upper and lower plates 71 and 72 so that there are two matching circles of ports situated coaxially with the axis of coils 76 and 77 and equidistant therefrom. A pair of fast acting valves 87 control the issuance of gas through the ports 86 into the plasma gun, one valve being on the upper plate 71 and the other being on the lower plate 72. The design and operation of the valves 87 is similar to that of the valve 42 hereinbefore described with reference to FIGS. 1 to 3, except that the valves are of circular configuration rather than being linear. Gas from a bottle 88 is transmitted to each of the valves 87 through a master valve 89. A valve control 91, identical to the valve control 59 of FIG. 1, supplies an actuating electrical signal to open both circular valves 87 simultaneously, the valve control being synchronized with the switch control 30 so that the switches 31 close immediately after the injection of gas through ports 86.

To maintain a vacuum in the field region and in the plasma gun, a vacuum pump 92 is connected to a central opening 93 in the lower coil cover 79.

Considering now the operation of the apparatus, it will be assumed that the capacitors 29 have been fully charged by power supply 84 and that the switch 33 has been opened. Gas under pressure is supplied to the valves 87 and the vacuum pump 92 is operating. The valve control 91 is activated, momentarily opening the two valves 87 and injecting gas into the plasma gun through the ports 86. Before the gas has diffused as far as the annular insulator 81, the switches 31 are closed by a signal from switch control 30. The gas ionizes and forms a conducting path between the upper and lower plates 71 and 72 so that current flows from capacitors 29 through switches 31, radially inward through the upper plate 71 to the region adjacent the gas, through the gas, and back through the lower plate 72 to the other side of capacitors 29. Passage of such current through the gas rapidly forms a plasma thereof and by means of the process discussed with reference to the first embodiment of the invention the magnetic field of the current through the plasma and adjacent plates 71 and 72 drives the plasma inward toward a containment region 102 formed by the containment field 101 around the coils 76 and 77 as shown in FIG. 11.

Figure 11:
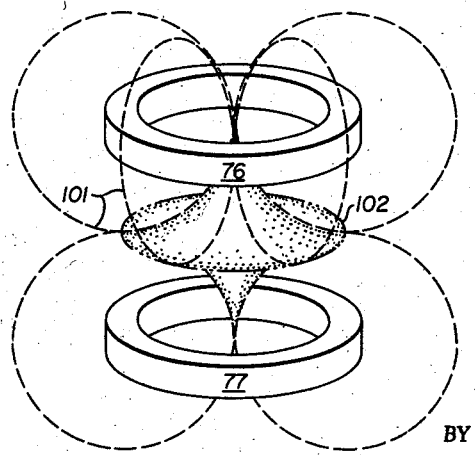
FIGURE 11 is a drawing showing the configuration of a cuspate containment region produced in the apparatus of FIGURE 10.

Referring now to FIG. 11, the field configuration and containment region between the coils 76 and 77 is shown diagrammatically. Magnetic flux lines are indicated by dashed lines 101 and the containment region is indicated by stippled outline 102. The accelerated plasma from the annular gun converges toward the center of the containment region 102 along the median plane between the coils 76 and 77. Using the described coil configuration, a 360° annular zone exists around the magnetic field through which the converging plasma can enter the containment region. As the plasma is accelerated inwardly the radius of the ring of plasma decreases causing the plasma density to increase. The inward velocity of the plasma ring steadily increases reaching a maximum velocity as it passes between the two field coils 76 and 77. Inside the containment region 102 the dense plasma converges towards a central point with consequent randomization of the motion of the individual particles therein. The velocital energy of the plasma is thus converted into thermal energy and conditions necessary for the collision and fusion of particles are created.

Energy is released by the fusion process in the form of energetic particles that lead to increased outward pressure against the magnetic lines 101 or to heating of a surrounding medium. As previously discussed, the energy from a fusion reaction will, under proper conditions, exceed the energy required to produce the reaction and the net energy may be obtained for useful purposes.

While the invention has been disclosed with respect to certain exemplary embodiments, it will be apparent to those skilled in the art that numerous variations and modifications may be made within the spirit and scope of the invention and thus it is not intended to limit the invention except as defined in the following claims.

What is claimed is:

1. In a plasma heating and containment device the combination comprising a vacuum vessel, magnetic field generating means providing a field within said vessel which field is symmetrical about a median plane and which has a central region of less intensity than the peripheral regions, plasma source means disposed around a substantial portion of the perimeter of said field at said median plane thereof, said plasma source means having a pair of spaced apart conductive plates aligned parallel with said median plane and forming a plasma chamber communicating with said vessel, means for admitting a quantity of gas into said chamber, and a power supply connected with said plates for applying a potential difference therebetween whereby said gas is ionized and accelerated within said median plane into said central region of said field.

2. A plasma heating and containment device substantially as described in claim 1 and wherein said plasma source means are disposed along at least two opposite portions of the perimeter of said field along said median plane whereby opposed plasma fronts converge at said central region of said field.

3. A plasma heating and containment apparatus comprising, in combination, a pair of spaced apart field coils, a power supply energizing said coils to provide a magnetic field which is symmetrical about a median plane and which has a central region of less intensity than the surrounding regions, a vacuum vessel surrounding at least the central region of said field, and a plasma source assembly facing said field along at least two opposite portions of the perimeter thereof, said plasma source assembly having a pair of spaced apart plates aligned parallel with said median plane of said field which plates form a plasma chamber at said median plane communicating with said vacuum vessel, said plates having a plurality of apertures each equally distant from said central region of said field, a gas supply communicating with each of said apertures, valve means providing for the timed injection of gas into said chamber through said apertures, an electrical potential source connected with said plates for the timed application of a potential difference therebetween, and control means actuating said valve means to inject gas into said chamber and actuating said potential source a controlled interval thereafter whereby said gas is ionized to form a plasma and accelerated towards said field along said median plane thereof.

4. In a plasma heating and containment apparatus, the combination comprising a pair of spaced apart rectangular coils, a first power supply energizing said coils to provide a magnetic field which field is symmetrical about a median plane and which has a linear central region of less intensity than the boundary regions, a pair of parallel rectangular plasma gun housings one disposed along each side of said magnetic field substantially at said median plane, each said housing having a pair of spaced apart plates defining a plasma chamber which plates are provided with a row of gas inlet apertures each equally spaced from said linear central field region, a gas source, valve means connecting with said gas source and said inlet apertures on said plasma guns for controlling the admittance of gas thereto, and a second power supply connected across said spaced apart plates of each of said plasma guns for applying a potential thereacross at points thereon more distant from said central field region than said inlet apertures to initiate the discharge of opposing broad plasma bodies into said magnetic field.

5. A plasma heating and containment apparatus substantially as described in claim 4 and wherein said pair of spaced apart rectangular coils are perpendicular to the central plane of said plasma gun housings and centered on said central plane thereof whereby said plasma bodies are discharged through said coils and wherein said coils are connected to said first power supply to carry current in similar directions whereby a mirror type containment field is established.

6. A plasma heating and containment apparatus substantially as described in cliam 4 and wherein said pair of spaced apart rectangular coils are connected to said first power supply to carry current in opposite directions whereby a cusp type containment field is established.

7. A plasma heating and containment device comprising, in combination, a pair of spaced apart circular coaxial field coils, a first power supply connected to said field coils to provide oppositely directed currents therein thereby establishing a cusp containment field which field is symmetrical about a median plane between said coils and which has a central region of less intensity than the surrounding region, a pair of spaced apart annular conductive plates disposed coaxially with respect to field coils and substantially at said median plane therebetween, means for injecting gas into an annular region between said plates which annular region is coaxial with said field coils, and a second power supply connected to each of said plates and applying a differing potential to each thereof at points more distant from said central region of said field than said annular gas injection region whereby an annular plasma body is accelerated radially inward to said central region of said field.

8. In a plasma heating and containment device, the combination comprising a pair of spaced apart circular coaxial field coils, a first power supply connected to said field coils to provide oppositely directed currents therein thereby establishing a cusp magnetic field which field is symmetrical about a median plane between said coils and which has a central region of less intensity than the surrounding region, a pair of spaced apart annular conductive plates disposed coaxially with respect to said field coils substantially at said median plane of said field, each of said plates having a plurality of gas inlet apertures arranged in a coaxial annular band thereon, a gas source, a pair of annular valve structures one disposed against each of said plates and operable to admit gas from said source to said apertures in said plates, a second power supply, switch means for connecting said second power supply across said plates at a plurality of points which points are distributed around said plates in an annular band of greater radius than said annular band of inlet apertures thereon, and a control means regulating the timing of operation of said switch means relative to that of said valve structures.

9. A plasma heating and containment device substantially as described in claim 15 and wherein said valve structure comprises a plurality of valve members each having a normal position occluding one of said gas inlet apertures in said plates, a plurality of resilient elements bearing against said valve members to force said members into said occluding relationship to said inlet apertures, means forming a restricted chamber over each of said valve members, each having a minute orifice communicating with said gas source, a dynamic shock transmitting means adjacent each of said valve members and having a first portion in contact therewith and having a second portion external to said chamber over said valve member, an electrical conductor disposed in proximity to said second portion of each of said shock transmitting means, and means for applying a sudden electrical current to said conductor for initiating a shock whereby each said valve member is momentarily moved from said normal position thereof and gas from each of said chambers is emitted through the associated aperture.

10. A valve structure for simultaneously emitting a regulated jet of gas from a gas source through a plurality of openings, said valve structure comprising a plurality of valve members each having a normal position closing one of said openings, a plurality of resilient elements bearing against said valve members to force said members into said normal position thereof, means forming a restricted chamber over each of said valve members, each having a minute orifice communicating with said gas source, a dynamic shock transmitting means adjacent each of said valve members and having a first portion in contact therewith and having a second portion external to said chamber over said valve member, an electrical conductor disposed in proximity to said second portion of each of said shock transmitting means, and means for applying a sudden electrical current to said conductor for initiating a shock whereby said valve members are momentarily moved from said normal positions thereof and gas from each of said chambers is emitted through the associated one of said openings.

References Cited in the file of this patent

UNITED STATES PATENTS

| | | |
|---|---|---|
| 2,920,236 | Chambers | Jan. 5, 1960 |
| 2,927,232 | Luce | Mar. 1, 1960 |
| 2,940,011 | Kolb | June 7, 1960 |
| 2,997,431 | Bell | Aug. 22, 1961 |
| 3,059,149 | Salisbury | Oct. 16, 1962 |
| 3,093,765 | Prevot | June 11, 1963 |
| 3,096,269 | Halbach et al. | July 2, 1963 |

OTHER REFERENCES

Project Sherwood, by A. S. Bishop Addison, Wesley Publication Co., Reading, Mass., 1958, pages 119–126.